United States Patent
Lee et al.

(10) Patent No.: US 11,527,794 B2
(45) Date of Patent: Dec. 13, 2022

(54) METAL AIR BATTERY, METHOD OF MANUFACTURING THE SAME, APPARATUS INCLUDING THE METAL AIR BATTERY, AND SYSTEM AND METHOD OF CONTROLLING THE METAL AIR BATTERY

(71) Applicant: SAMSUNG ELECTRONICS CO., LTD., Suwon-si (KR)

(72) Inventors: Heungchan Lee, Seongnam-si (KR); Hyunpyo Lee, Seoul (KR); Jungock Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 173 days.

(21) Appl. No.: 17/176,490

(22) Filed: Feb. 16, 2021

(65) Prior Publication Data

US 2021/0280932 A1    Sep. 9, 2021

(30) Foreign Application Priority Data

Mar. 5, 2020   (KR) .................... 10-2020-0027987

(51) Int. Cl.
| | | |
|---|---|---|
| H01M 12/08 | (2006.01) |
| H01M 4/86 | (2006.01) |
| H01M 12/02 | (2006.01) |
| H01M 12/06 | (2006.01) |

(52) U.S. Cl.
CPC ........... *H01M 12/08* (2013.01); *H01M 4/861* (2013.01); *H01M 12/02* (2013.01); *H01M 12/06* (2013.01)

(58) Field of Classification Search
None
See application file for complete search history.

(56) References Cited

U.S. PATENT DOCUMENTS

2018/0090802 A1   3/2018  Kwon et al.
2018/0123116 A1   5/2018  Lee et al.

FOREIGN PATENT DOCUMENTS

| KR | 1020170071336 A | 6/2017 |
| KR | 1020180034211 A | 4/2018 |
| KR | 1020180126251 A | 11/2018 |

OTHER PUBLICATIONS

Sakai. "Influence of the Porous Structure of the Cathode on the Discharge Capacity of Lithium-Air Batteries." (Year: 2017).*
Giordani et al., "A Molten Salt Lithium-Oxygen Battery", Journal of the American Chemical Society, 2016, 138, 2656-2663.
Karkera et al., "An Inorganic Electrolyte Li—O2 BAttery with High Rate and Improved Performance", ACS Appl. Energy Mater. 2018, 1, 1381-1388.
Sakai et al., "Influence of the Porous Structure of the Cathode on the Discharge Capacity of Lithium-Air Batteries". Journal of the electrochemical society, 164(13), 2018, A3075-A3080.
Xia et al., "A high-energy-density lithium-oxygen battery based on a reversible four-electron conversion to lithium oxide", Science, 361, 2018, 777-781.

* cited by examiner

*Primary Examiner* — Haroon S. Sheikh
(74) *Attorney, Agent, or Firm* — Cantor Colburn LLP

(57) ABSTRACT

A metal air battery apparatus includes: a metal air cell including a cathode layer including pores, an anode layer facing the cathode layer, and a solid electrolyte layer between the cathode layer and the anode layer; and a controller configured to control at least one of a charge rate or a discharge rate of the metal air cell based on a porosity of the cathode layer.

21 Claims, 21 Drawing Sheets

METAL AIR BATTERY, METHOD OF MANUFACTURING THE SAME, APPARATUS INCLUDING THE METAL AIR BATTERY, AND SYSTEM AND METHOD OF CONTROLLING THE METAL AIR BATTERY

CROSS-REFERENCE TO RELATED APPLICATION

This application claims priority to and the benefit of Korean Patent Application No. 10-2020-0027987, filed on Mar. 5, 2020, in the Korean Intellectual Property Office, and all the benefits accruing therefrom under 35 U.S.C. § 119, the content of which in its entirety is incorporated herein by reference.

BACKGROUND

Field

The present disclosure relates to a battery that may be charged and discharged, and more particularly, to a metal air battery capable of providing improved energy density, a method of manufacturing the same, an apparatus including the metal air battery, and a system and method of controlling, e.g., operating, the metal air battery.

Description of Related Art

A metal air battery, such as a lithium metal battery, may have high specific energy or energy density and may be used as an energy source for electric vehicles. In the case of a lithium metal battery including a solid electrolyte, a cathode of the lithium metal battery may have improved ion conductivity by including water, e.g., water vapor. A metal air battery may be used in a non-humidified environment, for example, in an environment of 100° C. or higher. There remains a need for a metal air battery that provides high energy density and remains stable when used in a non-humidified environment, environment, for example, at 100° C.

SUMMARY

According to an embodiment, provided is a metal air battery capable of providing improved energy density.

According to an embodiment, provided is a method of manufacturing the metal air battery.

According to an embodiment, provided is an apparatus including the metal air battery.

According to an embodiment, provided is a system for controlling a metal air battery that provides improved charging and discharging efficiency.

According to an embodiment, provided is a method of controlling the charging and discharging of a metal air battery to provide improved charging and discharging efficiency.

Additional aspects will be set forth in part in the description which follows and, in part, will be apparent from the description.

In accordance with an aspect of the disclosure, a metal air battery apparatus includes a metal air cell including a cathode layer including pores, an anode layer facing the cathode layer, and a solid electrolyte layer between the cathode layer and the anode layer; and a controller configured to control at least one of a charge rate or a discharge rate of the metal air cell based on a porosity of the cathode layer.

The cathode layer may include a mixed ionic electronic conductor ("MIEC"). The cathode layer may include an electron conductive layer that provides a path for oxygen flow and an ion conductive layer that provides a path for oxygen flow. Each of the electron conductive layer and the ion conductive layer may be in fluid communication with a source of oxygen. The porosity of the cathode layer may be in a range of about 0.2 to about 0.9, based on a total volume of the cathode layer of 1.

The metal air cell may further include a first electrode terminal; a second electrode terminal; and a port in fluid communication with the cathode layer, wherein the port configured is configured to permit determination of the porosity of the cathode layer.

In accordance with an aspect of the disclosure, a metal air battery apparatus includes a metal air battery including a first metal air cell including a first cathode layer including pores; a first anode layer facing the first cathode layer, and a solid electrolyte layer between the first cathode layer and the first anode layer, and a second cell at a location different from a location of the first metal air cell; and a controller configured to control at least one of a charge rate or a discharge rate of the first metal air cell based on a porosity of the first cathode layer.

The second cell may include a second metal air cell including a second cathode layer including pores, and a porosity of the second cathode layer may be the same as or different from the porosity of the first cathode layer. The controller may be configured to control at least one of a charge rate or a discharge rate of the second metal air cell based on the porosity of the second cathode layer.

The controller may include a first controller provided to control at least one of a charge rate or a discharge rate of the first metal air cell based on the porosity of the first cathode layer; and a second controller configured to control at least one of a charge rate or a discharge rate of the second metal air cell based on the porosity of the second cathode layer. Each of the first and second cathode layers may include a mixed ionic electronic conductor ("MIEC").

The first metal air cell may further include a first electrode terminal, a second electrode terminal, and a port in fluid communication with the first cathode layer, wherein the port is configured to permit determination of the porosity of the first cathode layer.

The second metal air cell may include a second anode layer facing the second cathode layer, a solid electrolyte layer between the second cathode layer and the second anode layer, a first electrode terminal, a second electrode terminal, and a port in fluid communication with second cathode layer, wherein the port is configured to permit determination of the porosity of the second cathode layer.

In accordance with an aspect of the disclosure, a metal air cell includes: a cathode layer including a mixed ionic electronic conductor; an anode layer facing the cathode layer; and a solid electrolyte layer between the cathode layer and the anode layer, wherein a porosity P1 of the cathode layer satisfies Equation 2

$$(-0.122\ \ln(R)+0.3) \le P1 \le (-0.122\ \ln(R)+0.5),$$

wherein R is a charge rate or a discharge rate of the metal air cell and is in a range of about 0.01 C to about 2.3 C. The porosity of the cathode layer may be in a range of about 0.2 to about 0.6, based on a total volume of the cathode layer of 1. The porosity of the cathode layer may be in a range of about 0.2 to about 0.4, based on a total volume of the cathode layer of 1.

In accordance with an aspect of the disclosure, a method of operating a metal air cell includes determining a porosity of a cathode layer of the metal air cell; determining a charge rate or a discharge rate of the metal air cell according to Equation 3

$$e^{((P1-0.3)/-0.122)} \leq R \leq e^{((P1-0.5)/-0.122)},$$

wherein P1 is the porosity of the cathode layer of the metal air cell and R is a charge rate or a discharge rate of the metal air cell; and controlling at least one of a charge rate or a discharge rate of the metal air cell according to Equation 3.

The method may include controlling the charge rate of the metal air cell. The method may include controlling the discharge rate the metal air cell. P1 may be in a range of about 0.2 to about 0.9, based on a total volume of the cathode layer of 1.

In accordance with an aspect of the disclosure, a metal air cell includes a cathode layer having a porosity in a range of about 0.2 to about 0.9, based on a total volume of the cathode layer of 1; an anode layer facing the cathode layer, the anode layer including lithium; an anode electrolyte layer between the cathode layer and the anode layer, the anode electrolyte layer including sodium nitrate and potassium nitrate; and a cathode electrolyte layer between the anode electrolyte layer and the cathode layer, the cathode electrolyte layer including lithium, titanium, and aluminum.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
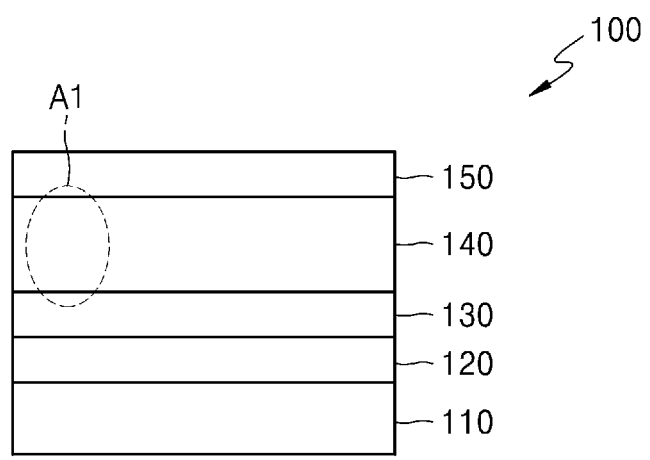
FIG. 1 is a cross-sectional view of an embodiment of a metal air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An improved energy density of a metal air battery may be related to a charge/discharge rate of the metal air battery, that is, a C-rate and a porosity (also referred to herein as "porosities") of a cathode layer. A porosity of a cathode layer at which the energy density of a metal air battery is improved at a given C-rate, and an optimum C-rate when the cathode layer has a given porosity, may be helpful in designing and using the metal air battery, and the metal air battery may be used in a wider range of fields and in various environments.

The term "battery" often refers to a plurality of electrochemical cells connected in a suitable combination of series and parallel connections. For convenience, as used herein, the term "battery" may refer to a plurality of cells, or may be used to refer to a single cell.

As used herein, a C-rate means a charge speed or a discharge speed of a battery. When a battery having a discharge capacity of 1.6 ampere-hours is discharged in 1.6 ampere and completely discharged after 1 hour, C-rate is 1, that is, 1 C.

Hereinafter, a metal air battery capable of providing improved energy density in a given use environment, according to an embodiment, a method of manufacturing the same, an apparatus including the metal air battery, and a system and method of controlling, e.g., operating, the metal air battery will be described with reference to the accompanying drawings.

FIG. 1 is an illustration of a metal air cell, i.e., a metal air battery, e.g., a first battery, according to an embodiment.

Referring to FIG. 1, the first battery 100 includes an anode layer 110, an anode electrolyte layer 120, a cathode electrolyte layer 130, a cathode layer 140, and a gas diffusion layer 150. The anode layer 110 may be, for example, a lithium layer, a zinc layer, an aluminum layer, or a magnesium layer. The anode electrolyte layer 120 and the cathode electrolyte layer 130 may provide a path for ion transport. In an embodiment, the anode electrolyte layer 120 and the cathode electrolyte layer 130 may provide a path for ion transport (for example, lithium ion transport) moving from the anode layer 110 to the cathode layer 140. The anode electrolyte layer 120, which is a solid electrolyte layer, may include a separator impregnated with a nitrate eutectic layer. The separator may prevent contact between the cathode layer 140 and the anode layer 110 and block oxygen movement, e.g., oxygen transport. The nitrate eutectic layer may be a eutectic layer including sodium nitrate, potassium nitrate, or a combination thereof, but is not limited thereto. Any suitable material, e.g., having suitable oxygen blocking properties, may be used. The anode electrolyte layer 120 may include a support supporting the nitrate eutectic layer, and the support may include, for example, a glass fiber material. The cathode electrolyte layer 130 may include a solid electrolyte layer that allows for ion transport (e.g., lithium ion transport) related to the operation of the first battery 100. The cathode electrolyte layer 130 may include, for example, $Li_{1-x}Al_xTi_{2-x}(PO_4)_3$ wherein $0 \leq x \leq 0.5$ ("LATP"), but is not limited thereto.

The applicants have surprisingly discovered that the energy density of the cell (e.g., battery) at a selected rate depends on the cathode layer porosity. The cathode layer 140 may have a porosity selected to provide improved energy density of the first battery 100 for a selected charge or discharge rate. In other words, the cathode layer 140 may have a porosity selected to provide an improved energy density at a selected charge or discharge rate. In addition, the cathode layer 140 may have a porosity sufficient to allow oxygen to flow therein.

In an embodiment, the porosity of the cathode layer 140 satisfies Equation 1.

$$P1 = -0.122 \ln(R) + a, \quad \text{Equation 1}$$

wherein P1 is a porosity of the cathode layer, based on a total volume of the cathode layer of 1, R is a charge rate or a discharge rate, and a is $0.3 \leq a \leq 0.5$.

Equation 1 can be expressed as, and is equivalent to Equation 2, $$(-0.122 \ln(R)+0.3) \leq P1 \leq (-0.122 \ln(R)+0.5), \quad \text{Equation 2}$$

or Equation 3, $$e^{((P1-0.3)/-0.122)} \leq R \leq e^{((P1-0.5)/-0.122)}, \quad \text{Equation 3}$$

wherein P1 is a porosity of the cathode layer, based on a total volume of the cathode layer of 1, and R is a charge rate or a discharge rate.

As used herein, a maximum energy density or an improved energy density can mean an energy density within ±20%, 10% or 5% from the maximum energy density.

The cathode layer porosity indicates how much of the plurality of pores, through which oxygen may be introduced, is included in the cathode layer 140. The porosity of the cathode layer may be expressed using a density of pores or distribution of pores, and may be measured with physical quantity (e.g., volume, weight, conductivity, or resistance) with respect to the remaining portion of the cathode layer 140 excluding the pores. In addition, the porosity may be expressed by using a size of pores. In addition, when the cathode layer 140 has a given porosity, because the actual physical quantity of cathode layer porosity in a cell may vary, the cathode layer porosity may be expressed or measured based on the actual measured physical quantity of the cathode layer porosity of the cell. Therefore, the physical quantity or a measurement value related to the cathode layer porosity may be used as an input value for Equations 1 to 3, instead of the porosity of the cathode layer determined otherwise.

As used herein, unless otherwise defined, a porosity is a volume of pores, based on a total volume. For example, a cathode layer having a porosity of 50 vol %, based on a total volume of the cathode layer (100 vol %), would be 0.5.

In an embodiment, the cathode layer 140 having a porosity satisfying Equation 1 to 3 includes a plurality of pores through which oxygen may be introduced and a mixed ionic electronic conductor ("MIEC") layer. The MIEC layer may be a porous material layer including empty spaces (pores). An example of a suitable material for the MIEC layer may be a LiLaRuO, or LaRuO ("LRO"), to provide a LiLaRO layer or a LRO layer, but is not limited thereto. In an embodiment, the cathode layer 140 can perform an equivalent role to the MIEC layer. In an aspect, the cathode layer 140 has a layered structure different from the MIEC layer. For example, the cathode layer 140 may have a layer structure including an electron conductor layer providing for suitable electron transport, and an ion conductor layer providing for suitable ion transport. The electron conductor layer and the ion conductor layer may be stacked to provide a structure in which electrons and ions may contact, e.g., meet each other. The electron conductor layer may include a first porous material layer through which oxygen may be introduced. The ion conductor layer may include a second porous material layer through which oxygen may transport. The material or material properties of the first porous material layer may be different from those of the second porous material layer.

Next, the gas diffusion layer 150 is provided on the cathode layer 140. External oxygen, e.g., air, may be introduced into the cathode layer 140 through the gas diffusion layer 150. The "external oxygen" may denote oxygen provided from an outside of the first battery 100. The external oxygen may be oxygen in the air. Therefore, the gas diffusion layer 150 may provide a passage for introducing external air into the cathode layer 140. The "external oxygen" or "external air" may include, for example, oxygen or air in the atmosphere, but in an embodiment, may include oxygen or air supplied from an oxygen supply apparatus or an air supply apparatus that is separately provided to an apparatus or a system to which the first battery 100 is mounted. The gas diffusion layer 150 may provide a passage for electrons, e.g., have suitable electrical conductivity. For example, when the first battery 100 is discharged, electrons, 2e⁻ in FIG. 2, generated in the anode layer 110 are transferred to the gas diffusion layer 150 through an external circuit connected to the first battery 100, and may be introduced to the cathode layer 140 through the gas diffusion layer 150. The electrons introduced in this way may be combined with ions (e.g., lithium ions) that have passed through the cathode electrolyte layer 130 in the cathode layer 140. Oxygen is involved in the combining process. When the first battery 100 is a humidifying battery, moisture ($H_2O$) is used in the combining process. When the first battery 100 is a high-temperature metal air battery, that is, a non-humidifying battery, moisture is not used in the combining process.

Figure 2:
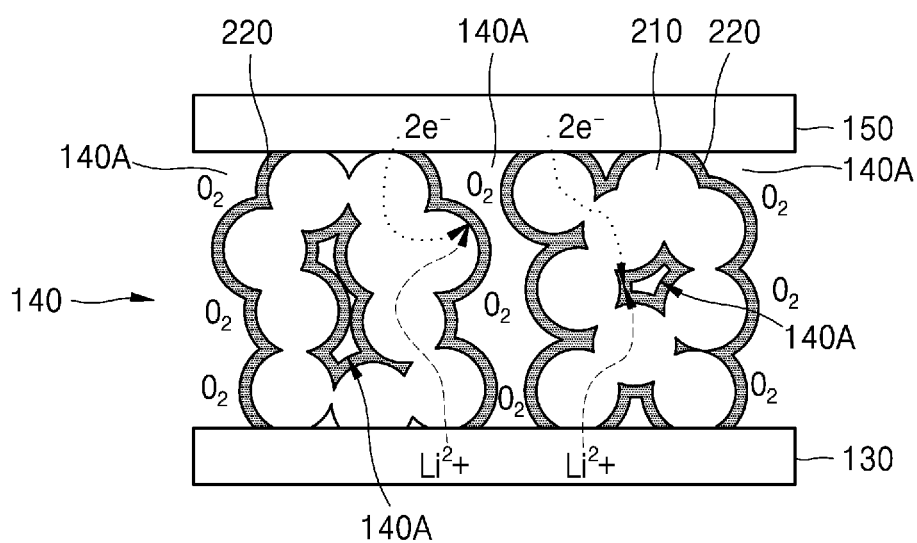
FIG. 2 is an enlarged cross-sectional view of a first region (A1) of FIG. 1.

FIG. 2 is an enlarged cross-sectional view of a first region A1 of FIG. 1.

From FIG. 2, it may be seen that lithium ions passed through the cathode electrolyte layer 130 flow into the MIEC layer 210 of the cathode layer 140, oxygen flows into porous regions 140A of the cathode layer 140 through the gas diffusion layer 150, and electrons flow into the MIEC layer 210 of the cathode layer 140 through the gas diffusion layer 150. The porous regions 140A may be empty spaces in the cathode layer 140 in which the MIEC layer 210 does not exist. Also, the porous regions 140A may be empty spaces in the MIEC layer 210. The MIEC layer 210 may be an aggregate body in which a plurality of particles are agglomerated. In the aggregate body, the particles may be in contact with each other, and the porous regions 140A may be present between the MIEC particles. Reference numeral 220 denotes lithium oxide ($Li_2O$) formed on a surface of the MIEC layer 210 during a discharge process.

EXAMPLES

Example 1: Charge at 0.05 C

Figure 3:
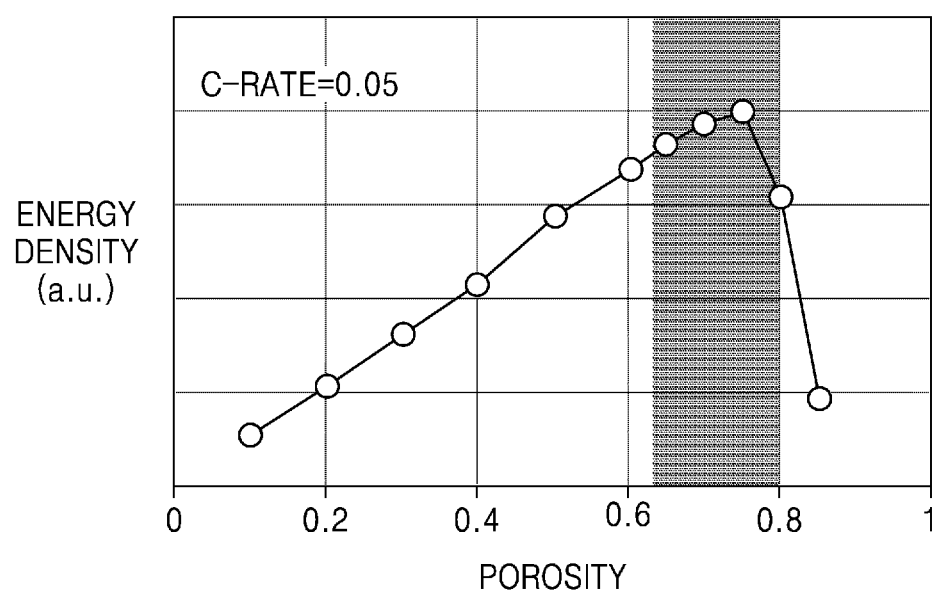
FIG. 3 is a graph of energy density (arbitrary units (a.u.)) versus porosity of the cathode layer of the metal air battery of FIG. 1 showing the results of Example 1 and the energy density of the metal air battery when charged at 0.05 C (C-Rate=0.05)

FIG. 3 shows a first result performed to measure a relationship between porosity of the cathode layer 140 of the first battery 100 of FIG. 1 and an energy density of the first battery 100. Shown in FIG. 3 is energy density of the first battery 100 according to porosity of the cathode layer 140 when charged at 0.05 C. In the first result, the cathode layer 140 comprises an MIEC layer having an electron conductivity and lithium ion conductivity of $10^{-5}$ siemens per square centimeter ($S/cm^2$) or greater. In addition, the first battery 100 is set to be operated under a humidified or non-humidified condition.

In FIG. 3, the horizontal axis represents porosity of the cathode layer 140 and the vertical axis represents energy density of the first battery 100.

Referring to FIG. 3, when the porosity of the cathode layer 140 is increased, the energy density of the first battery 100 increases, and when the porosity of the cathode layer 140 is about 0.75, the energy density of the first battery 100 is maximum. As the porosity of the cathode layer 140 becomes greater than 0.75, the energy density of the first battery 100 rapidly decreases.

The result of FIG. 3 indicates or suggests that, in a charging operation, when the charge rate is 0.05 C, the energy density of the first battery 100 is maximized when the porosity of the cathode layer 140 is about 0.75. In other words, the result of FIG. 3 indicates or suggests that when the porosity of the cathode layer 140 of the first battery 100 is about 0.75, the energy density of the first battery 100 may be maximized at a charge rate of 0.05 C. FIG. 3 may also indicate or suggest that as a second operation method of the first battery 100, a method of most effectively discharging energy stored in the first battery 100 including the cathode layer 140 having a porosity of about 0.75, is an method comprising discharging at 0.05 C.

Figure 4:
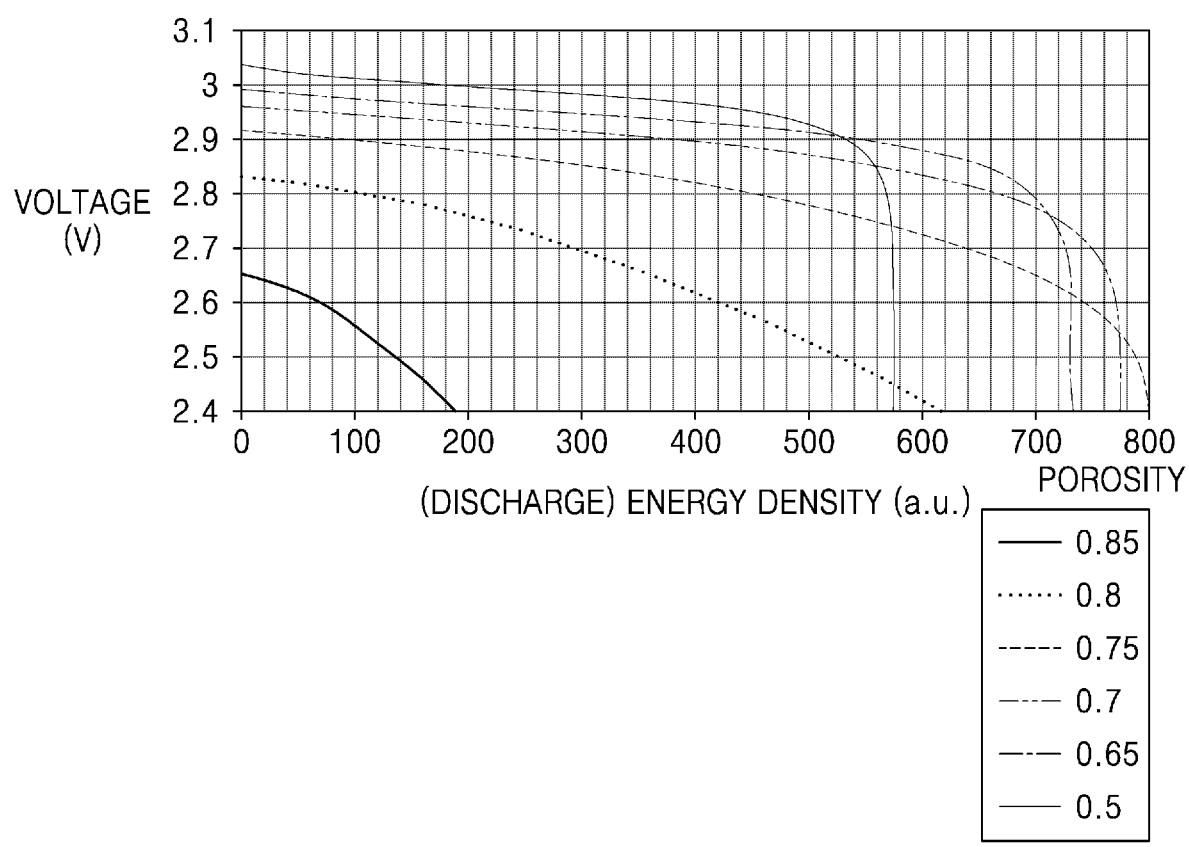
FIG. 4 is a graph of voltage (volts (V)) versus discharge energy density (a.u.) showing the results of Example 1 and discharge capacity for various porosities of a cathode layer of a metal air battery of FIG. 1 when charged at 0.05 C.

FIG. 4 shows discharge capacity according to the porosity of the cathode layer 140 of the first battery 100 when the first battery 100 is charged at 0.05 C.

In FIG. 4, the horizontal axis represents energy density discharged (supplied) from the first battery 100 for an entire discharge, and the vertical axis represents a voltage of the first battery 100.

In FIG. 4, first to sixth curves indicate a relationship between a voltage of the first battery 100 and a discharge energy density when the porosity of the cathode layer 140 is 0.85, 0.8, 0.75, 0.7, 0.65, or 0.5, respectively.

FIG. 4 shows that, when the porosity of the cathode layer 140 of the first battery 100 is about 0.75 (third curve), the energy density released, e.g., discharged, from the first battery 140 is at a maximum. Since discharging of the first battery 100 is releasing energy stored in the first battery 100, the result of FIG. 4 indicates or suggests that the first battery 100 may be charged to provide maximum energy density when the porosity of the cathode layer 140 of the first battery 100 is about 0.75 when charging at 0.05 C.

As a result, FIGS. 3 and 4 may indicate or suggest the same results.

Example 2: Charge at 0.2 C

Figure 5:
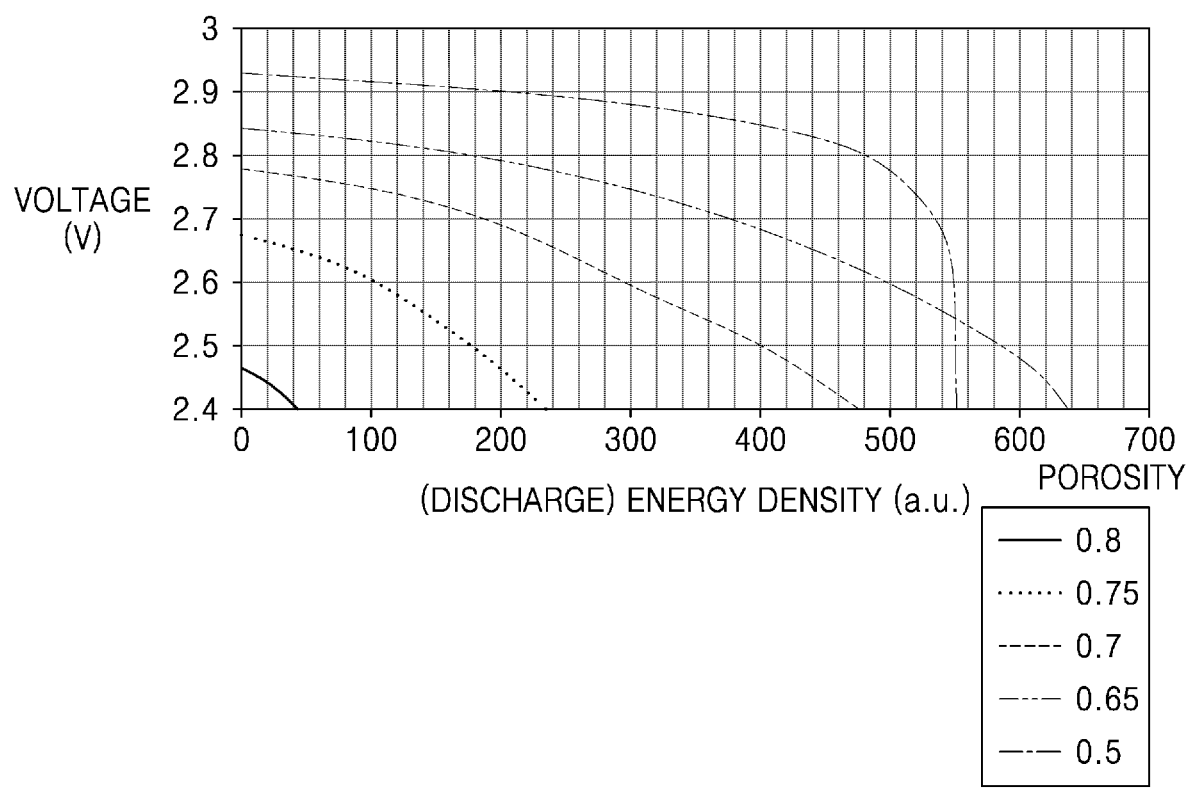
FIG. 5 is a graph of voltage (V) versus discharge energy density (a.u.) showing the results of Example 2 and discharge capacity for various porosities of a cathode layer of the metal air battery of FIG. 1 when charged at 0.2 C.

FIG. 5 shows discharge capacity according to the porosity of the cathode layer 140 of the first battery 100 when the first battery 100 is charged at 0.2 C.

In FIG. 5, the horizontal axis represents energy density discharged from the first battery 100 for an entire discharge, and the vertical axis represents a voltage of the first battery 100.

In FIG. 5, first to fifth curves show a relationship between a voltage of the first battery 100 and a discharge energy density when the porosity of the cathode layer 140 is 0.8, 0.75, 0.7, 0.65 or 0.5.

FIG. 5 shows that, when the porosity of the cathode layer 140 of the first battery 100 is about 0.65 (fourth curve), the energy density discharged from the first battery 100 is at a maximum. Since discharging of the first battery 100 is releasing energy stored in the first battery 100, the result of FIG. 5 indicates or suggests that, when the porosity of the cathode layer 140 of the first battery 100 is about 0.65, the first battery 100 may be charged at about 0.2 C to provide a maximum energy density.

Example 3: 0.5 C Charge

Figure 6:
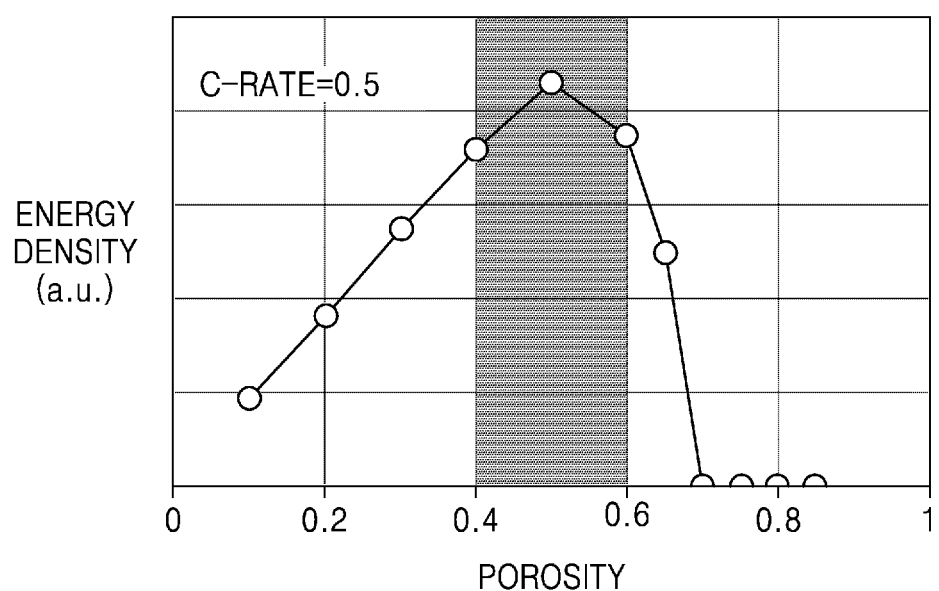
FIG. 6 is a graph of energy density (a.u.) versus porosity of the cathode layer of the metal air battery of FIG. 1 showing the results of Example 3 and the energy density of the metal air battery when charged at 0.5 C (C-Rate=0.5)

FIG. 6 shows a relationship between porosity of the cathode layer 140 of the first battery 100 of FIG. 1 and an energy density of the first battery 100 at a charge rate of 0.5 C. The other aspects of Example 3 were the same as Example 1.

In FIG. 6, the horizontal axis represents porosity of the cathode layer 140, and the vertical axis represents energy density of the first battery 100, respectively.

Referring to FIG. 6, as the porosity of the cathode layer 140 increases, the energy density of the first battery 100 also increases. However, when the porosity of the cathode layer 140 is about 0.5, the energy density of the first battery 100 is at a maximum. As the porosity of the cathode layer 140 is greater than about 0.5, the energy density of the first battery 100 rapidly decreases, and as the porosity of the cathode layer 140 is 0.7 or greater, the energy density of the first battery 100 becomes zero.

The result of FIG. 6 indicates or suggests that, in a charging operation, when the charge rate is 0.5 C and the porosity of the cathode layer 140 is about 0.5, the energy density of the first battery 100 is maximized. In other words, the result of FIG. 6 indicates or suggests that the energy density of the first battery 100 is maximized when the first battery 100 is charged at about 0.5 C and the porosity of the cathode layer 140 of the first battery 100 is about 0.5. FIG. 6 thus indicates or suggests, a charging method whereby the energy density of the first battery 100 may be maximized when the porosity of the cathode layer 140 of the first battery 100 is about 0.5. Since discharging of the first battery 100 may be regarded as an opposite process of charging, FIG. 6 also indicates or suggests, as a second operation method of the first battery 100, a method of most effectively discharging energy stored in the first battery 100 including the cathode layer 140 having a porosity of about 0.5, that is, an energy supply method comprising discharging at 0.5 C.

Figure 7:
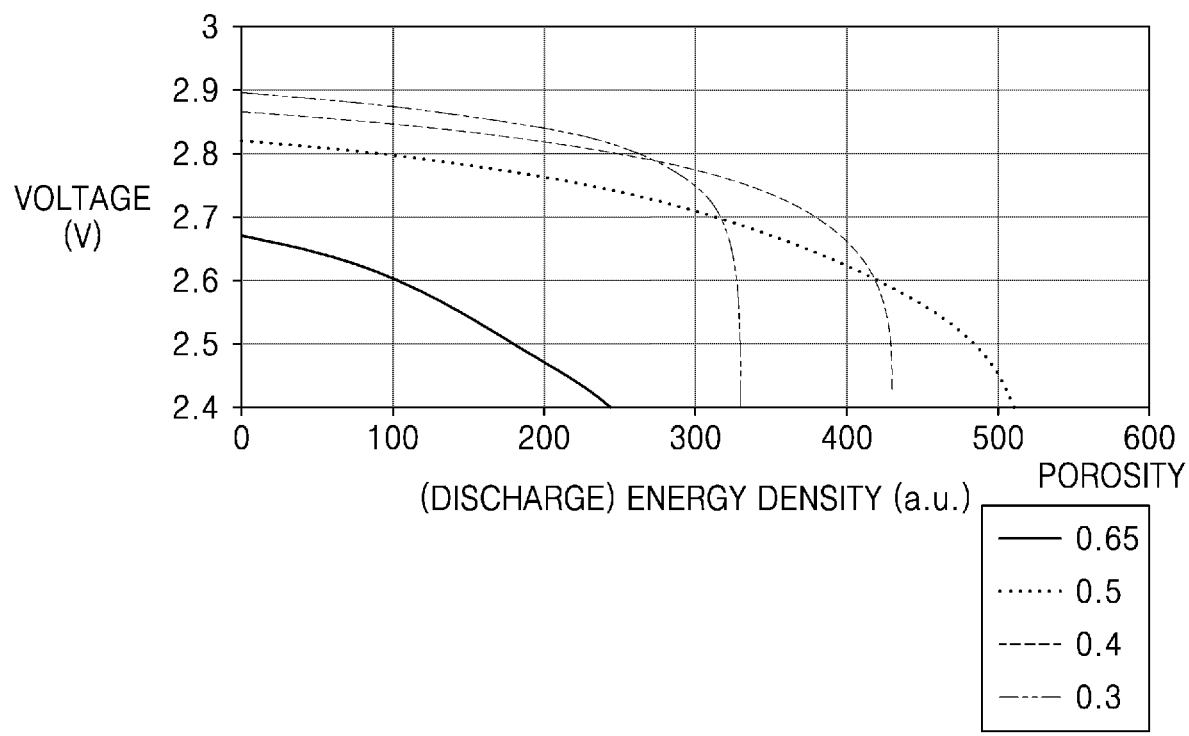
FIG. 7 is a graph of voltage (V) versus discharge energy density (a.u.) showing the results of Example 3 and discharge capacity for various porosities of a cathode layer of the metal air battery of FIG. 1 when charged at 0.5 C.

FIG. 7 shows discharge capacity according to porosities of the cathode layer 140 of the first battery 100 when the first battery 100 is charged at 0.5 C.

In FIG. 7, the horizontal axis represents energy density discharged (supplied) from the first battery 100 for an entire discharge, and the vertical axis represents voltage of the first battery 100.

In FIG. 7, first to fourth curves show a relationship between a voltage of the first battery 100 and a discharge energy density when the porosity of the cathode layer 140 is 0.65, 0.5, 0.4, or 0.3, respectively.

FIG. 7 shows that, when the porosity of the cathode layer 140 of the first battery 100 is about 0.5 (second curve), the energy density discharged from the first battery 100 is at a maximum. Since the discharge of the first battery 100 is releasing energy stored in the first battery 100, the result of FIG. 7 indicates or suggests that the first battery 100 may be charged to provide a maximum energy density using a charge rate of about 0.5 C when the porosity of the cathode layer 140 of the first battery 100 is about 0.5 in Example 3.

As a result, FIGS. 6 and 7 may suggest the same results to each other.

Example 4: 1 C Charge

Figure 8:
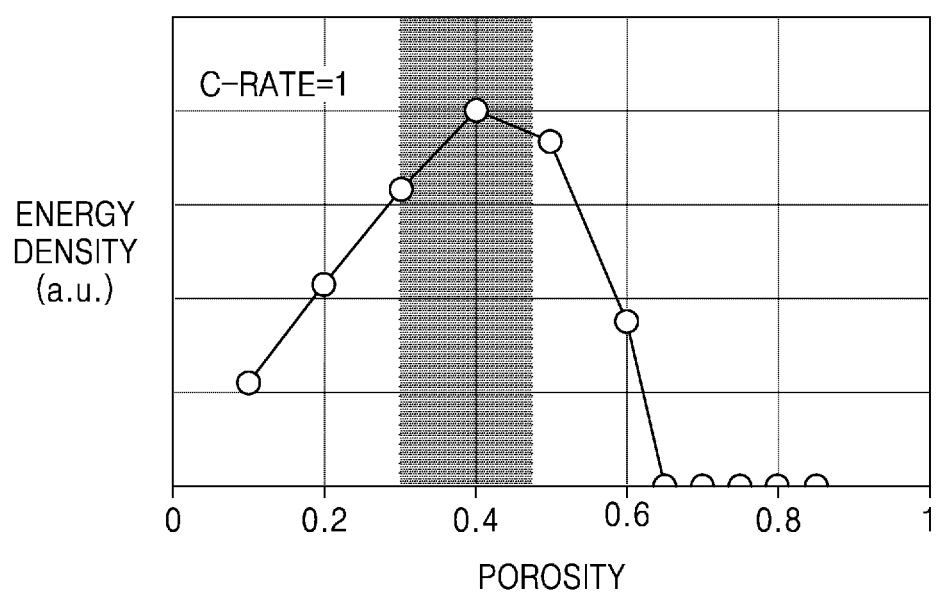
FIG. 8 is a graph of energy density (a.u.) versus porosity of the cathode layer of the metal air battery of FIG. 1 showing the results of Example 4 and the energy density of the metal air battery when charged at 1 C (C-Rate=1)

FIG. 8 shows a relationship between porosity of the cathode layer 140 of the first battery 100 of FIG. 1 and a maximum energy density of the first battery 100 at a charge rate of 10. The other aspects of the Example 4 were the same as the Example 1.

In FIG. 8, the horizontal axis represents porosity of the cathode layer 140, and the vertical axis represents energy density of the first battery 100, respectively.

Referring to FIG. 8, the energy density of the first battery 100 increases until the porosity of the cathode layer 140 increases to about 0.4. When the porosity of the cathode layer 140 is about 0.4, the energy density of the first battery 100 is at a maximum. When the porosity of the cathode layer 140 is greater than about 0.4, the energy density of the first battery 100 decreases, and the energy density of the first battery 100 becomes zero before the porosities of the cathode layer 140 reaches about 0.7.

The result of FIG. 8 indicates or suggests that, in a charging operation, when the charge rate is about 10, and the porosity of the cathode layer 140 is about 0.4, the energy density of the first battery 100 is maximized. In other words, the result of FIG. 8 indicates that the energy density of the first battery 100 is maximized when the first battery 100 is charged at about 10 and the porosity of the cathode layer 140 of the first battery 100 is about 0.4. That is, FIG. 8 suggests, as a first operation method of the first battery 100, a charging method whereby the energy density of the first battery 100, when the porosity of the cathode layer 140 of the first battery 100 is about 0.4, may be maximized by use of a charge rate of 10. Since discharging of the first battery 100 may be regarded as an opposite process of charging, FIG. 8 also indicates or suggests, as a second operation method of the first battery 100, a method of most effectively discharging the energy stored in the first battery 100 including the cathode layer 140 having porosity of about 0.4, that is, an energy supply method of discharging at 10.

Figure 9:
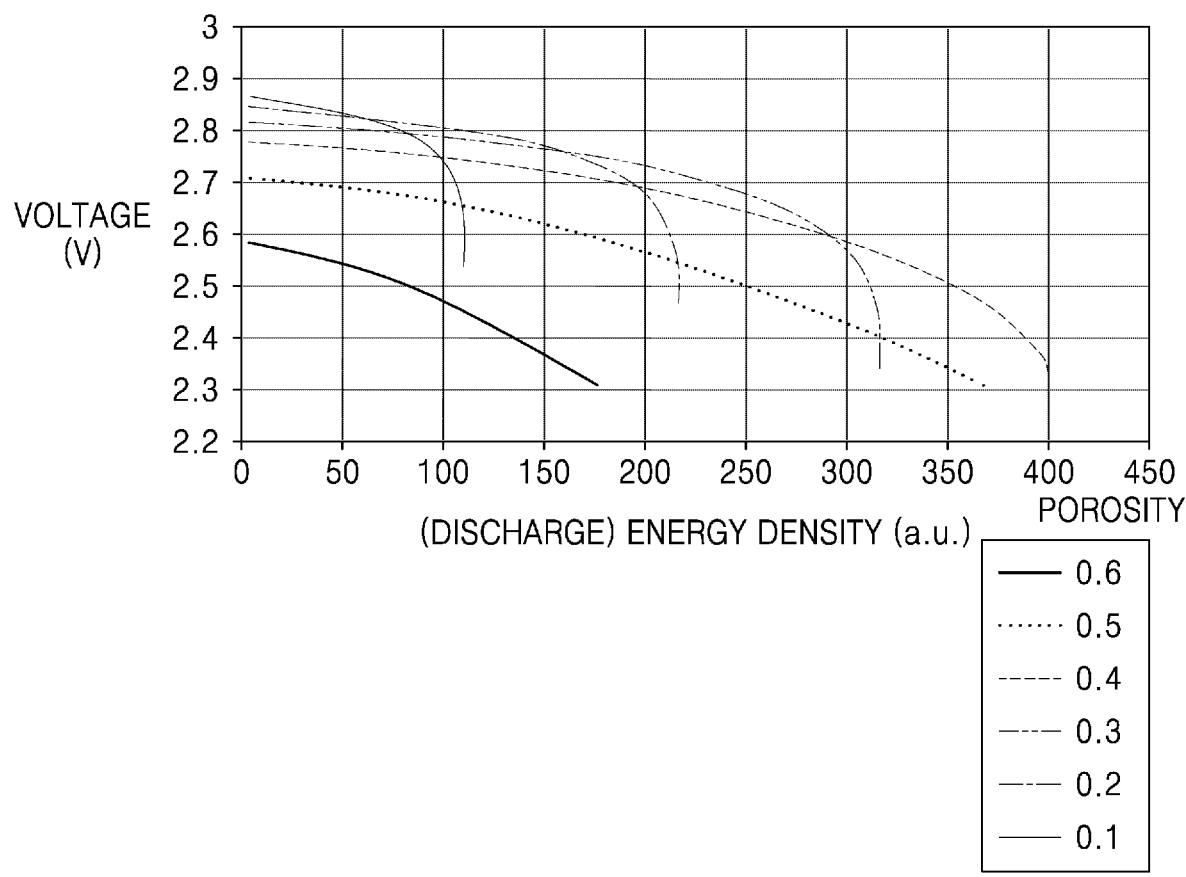
FIG. 9 is a graph of voltage (V) versus discharge energy density (a.u.) showing the results of Example 4 and discharge capacity for various porosities of a cathode layer of the metal air battery of FIG. 1 when charged at 1 C.

FIG. 9 shows discharge capacity according to a porosity of the cathode layer 140 of the first battery 100 when the first battery 100 is charged at 10.

In FIG. 9, the horizontal axis represents energy density discharged from the first battery 100 for an entire discharge, and the vertical axis represents voltage of the first battery 100 during the discharging.

In FIG. 9, first to sixth curves show a relationship between a voltage of the first battery 100 and a discharge energy density when the porosities of the cathode layer 140 is 0.6, 0.5, 0.4, 0.3, 0.2, or 0.1, respectively.

FIG. 9 shows that, when the porosity of the cathode layer 140 of the first battery 100 is about 0.4 (third curve), the energy density discharged from the first battery 100 is at a maximum. Since the discharge of the first battery 100 is releasing energy stored in the first battery 100, the result of FIG. 9 indicates or suggests that the first battery 100 may be charged to provide a maximum energy density, when the porosity of the cathode layer 140 of the first battery 100 is about 0.4, using a charge rate of about 10.

As a result, FIGS. 8 and 9 may indicate or suggest the same results to each other.

Example 5: Charge at 5 C

Figure 10:
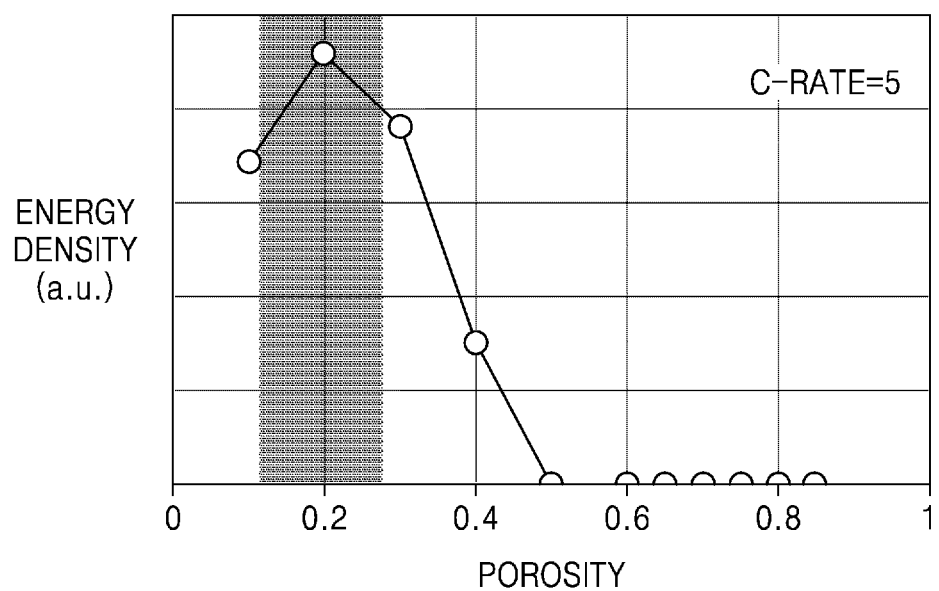
FIG. 10 is a graph of energy density (a.u.) versus porosity of the cathode layer of the metal air battery of FIG. 1 showing the results of Example 5 and the energy density of the metal air battery when charged at 5 C (C-Rate=5)

FIG. 10 shows a result performed to measure a relationship between porosity of the cathode layer 140 of the first battery 100 of FIG. 1 and a maximum energy density of the first battery 100 at a charge rate of 5 C. The other aspects of Example 5 were the same as in Example 1.

In FIG. 10, the horizontal axis represents porosity of the cathode layer 140, and the vertical axis represents energy density of the first battery 100, respectively.

Referring to FIG. 10, the energy density of the first battery 100 increases until the porosity of the cathode layer 140 increases to about 0.2. When the porosity of the cathode layer 140 is about 0.2, the energy density of the first battery 100 is maximized. When the porosity of the cathode layer 140 is greater than about 0.2, the energy density of the first battery 100 decreases. When the porosity of the cathode layer 140 is about 0.5, the energy density of the first battery 100 becomes zero.

The result of FIG. 10 indicates that in a charging operation, when the charge rate is about 5 C and the porosity of the cathode layer 140 is about 0.2, the energy density of the first battery 100 is maximized. In other words, the result of FIG. 10 indicates or suggests that the energy density of the first battery 100 is maximized when the first battery 100 is charged at about 5 C and the porosity of the cathode layer 140 of the first battery 100 is about 0.2. That is, FIG. 10 indicates or suggests, as a first operation method of the first battery 100, a charging method whereby the energy density of the first battery 100 may be maximized, when the porosity of the cathode layer 140 of the first battery 100 is about 0.2, using a charge rate of about 5 C. Since discharging of the first battery 100 may be regarded as an opposite process of charging, FIG. 10 also indicates or suggests, as a second operation method of the first battery 100, a method of most effectively discharging energy stored in the first battery 100 when the cathode layer 140 has a porosity of about 0.2, of discharging at a rate of 5 C.

Figure 11:
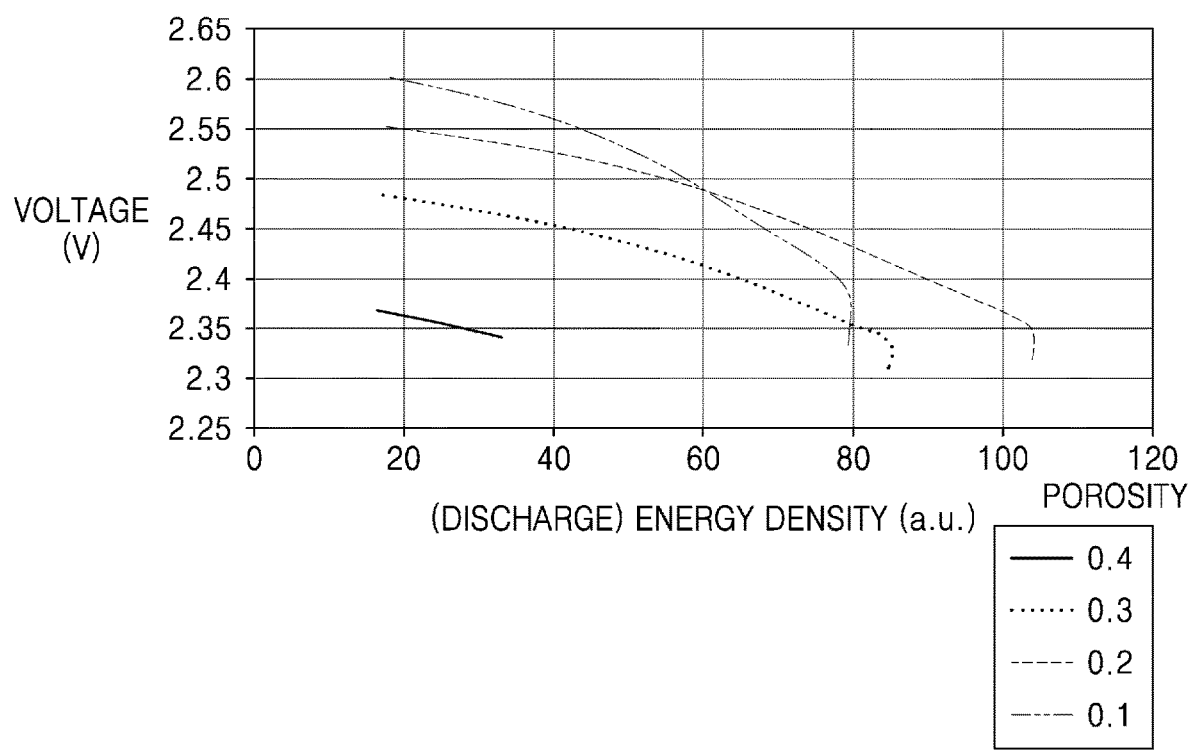
FIG. 11 is a graph of voltage (V) versus discharge energy density (a.u.) showing the results of Example 5 and discharge capacity for various porosities of a cathode layer of the metal air battery of FIG. 1 when charged at 5 C.

FIG. 11 shows discharge capacity according to the porosity of the cathode layer 140 of the first battery 100 when the first battery 100 is charged at a rate of 5 C.

In FIG. 11, the horizontal axis represents energy density discharged from the first battery 100 for an entire discharge, and the vertical axis represents voltage of the first battery 100 according to the discharging.

In FIG. 11, first to fourth curves show a relationship between a voltage of the first battery 100 and a discharge energy density when the porosity of the cathode layer 140 is 0.4, 0.3, 0.2, or 0.1, respectively.

FIG. 11 shows that when the porosity of the cathode layer 140 of the first battery 100 is about 0.2 (third curve), the energy density released, e.g., discharged, from the battery 140 is at a maximum. Since the discharge of the first battery 100 is releasing energy stored in the first battery 100, the result of FIG. 11 indicates or suggests that the first battery 100 may be charged to provide a maximum energy density when the porosity of the cathode layer 140 of the first battery 100 is about 0.2 at a charge rate of about 5 C.

As a result, FIGS. 10 and 11 may indicate or suggest the same results to each other.

Figure 12:
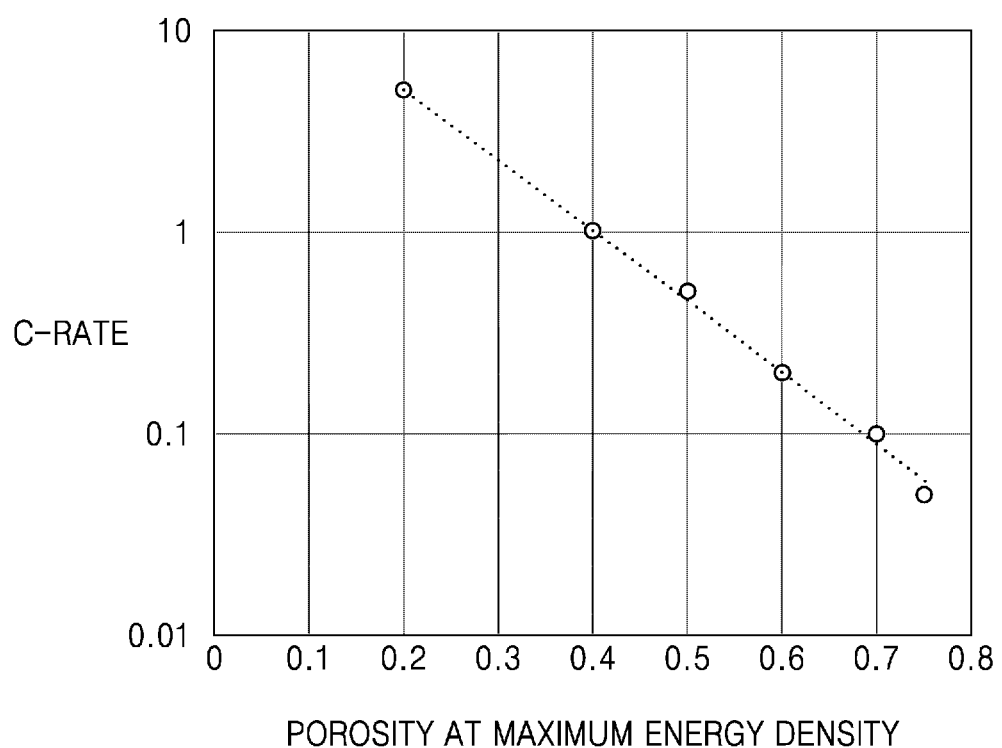
FIG. 12 is a graph of charge rate (C-Rate) versus porosity of the cathode layer of a metal air battery at maximum energy density.

Examples 1 to 5, as shown in FIGS. 3 to 11, indicate or suggest that the change in the rate to obtain a maximum energy density for the first battery 100 and the change in porosity of the cathode layer 140 to obtain a maximum energy density are opposite to each other. That is, when the charge or discharge rate increases, the porosity of the cathode layer 140 at which the first battery 100 has the maximum energy density decreases. FIG. 12 shows this fact.

FIG. 12 shows a relationship between the log of the discharge rate and the porosity of the cathode layer 140, in which the first battery 100 has a maximum energy density.

In FIG. 12, the horizontal axis and the vertical axis respectively indicate porosity and the discharge rate (C-rate) when the first battery 100 has a maximum energy density.

Referring to FIG. 12, when the porosity of the cathode layer 140 increases, the optimal charge or discharge rate decreases. The result of FIG. 12 provides information about the optimal charge or discharge rate for maximizing the energy density of the first battery 100 according to a change in porosity of the cathode layer 140 of the first battery 100. For example, when an initial porosity of the cathode layer 140 that is about 0.7 is reduced to about 0.4 in a process of using the first battery 100, changing a charge rate or a discharge rate from about 0.1 C to about 1 C provides improved energy density than if the rate was not changed. That is, when the porosity of the cathode layer 140 is changed as the first battery 100 is used, a charging/discharging time for the first battery 100 to have a maximum energy density may vary, e.g., as shown by Equation 3.

Figure 13:
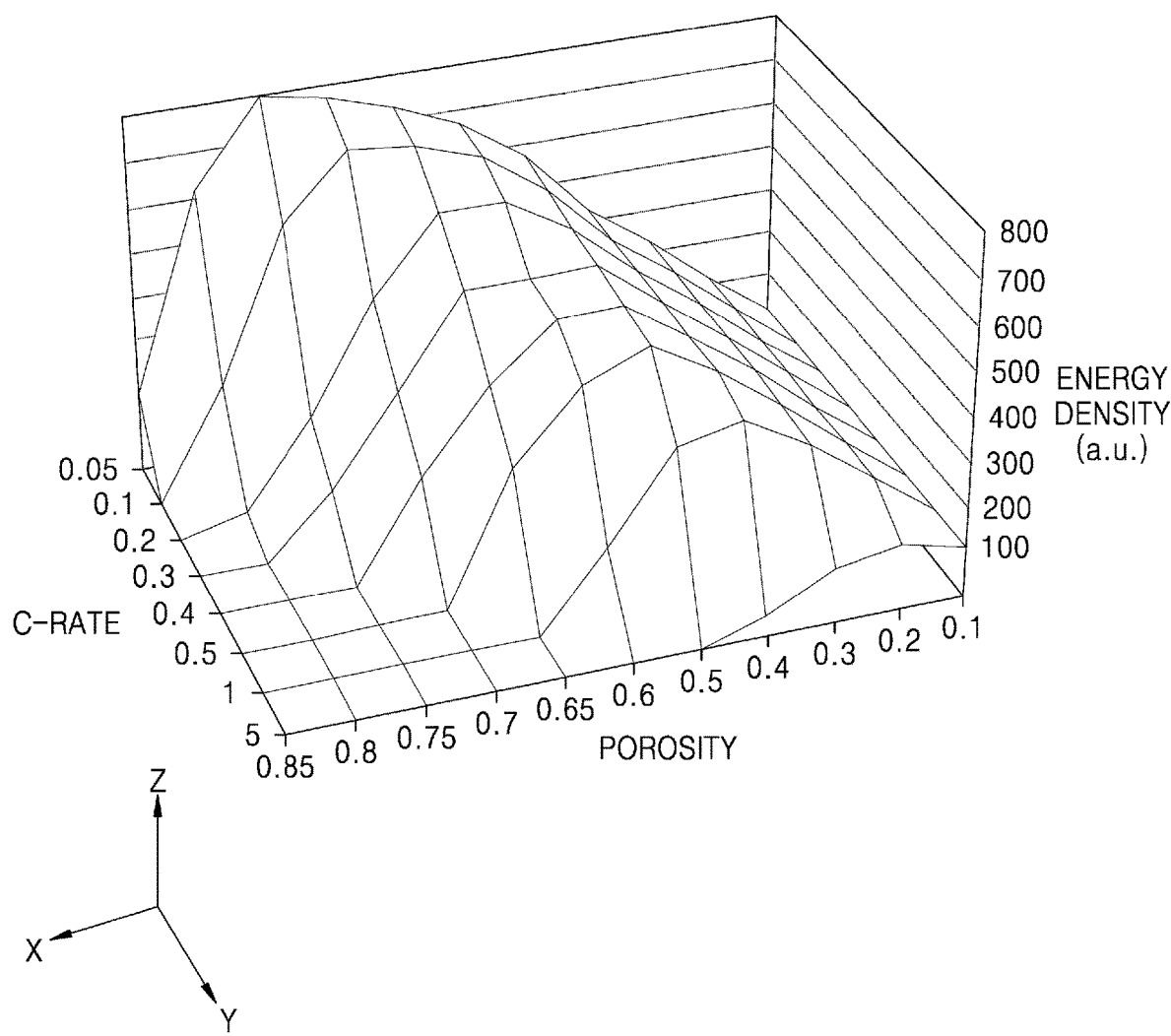
FIG. 13 is a three-dimensional ("3D") graph of charge rate (C-Rate), the porosity of the cathode layer of the metal air battery of FIG. 1, and a maximum energy density of the metal air battery of FIG. 1.

FIG. 13 is a synthesis of the results of Examples 1 to 5, and shows a three-dimensional ("3D") graph indicating the relationship between the charge or discharge rate, the porosity of the cathode layer, and the energy density of the metal air battery 100.

In FIG. 13, the x-axis represents the cathode layer porosity of the first battery 100, the y-axis represents charge or discharge rate, and the z-axis represents energy density, respectively. FIG. 13 provides information about the charge or discharge rate and porosity at which the energy density of the first battery 100 is maximized.

Figure 14:
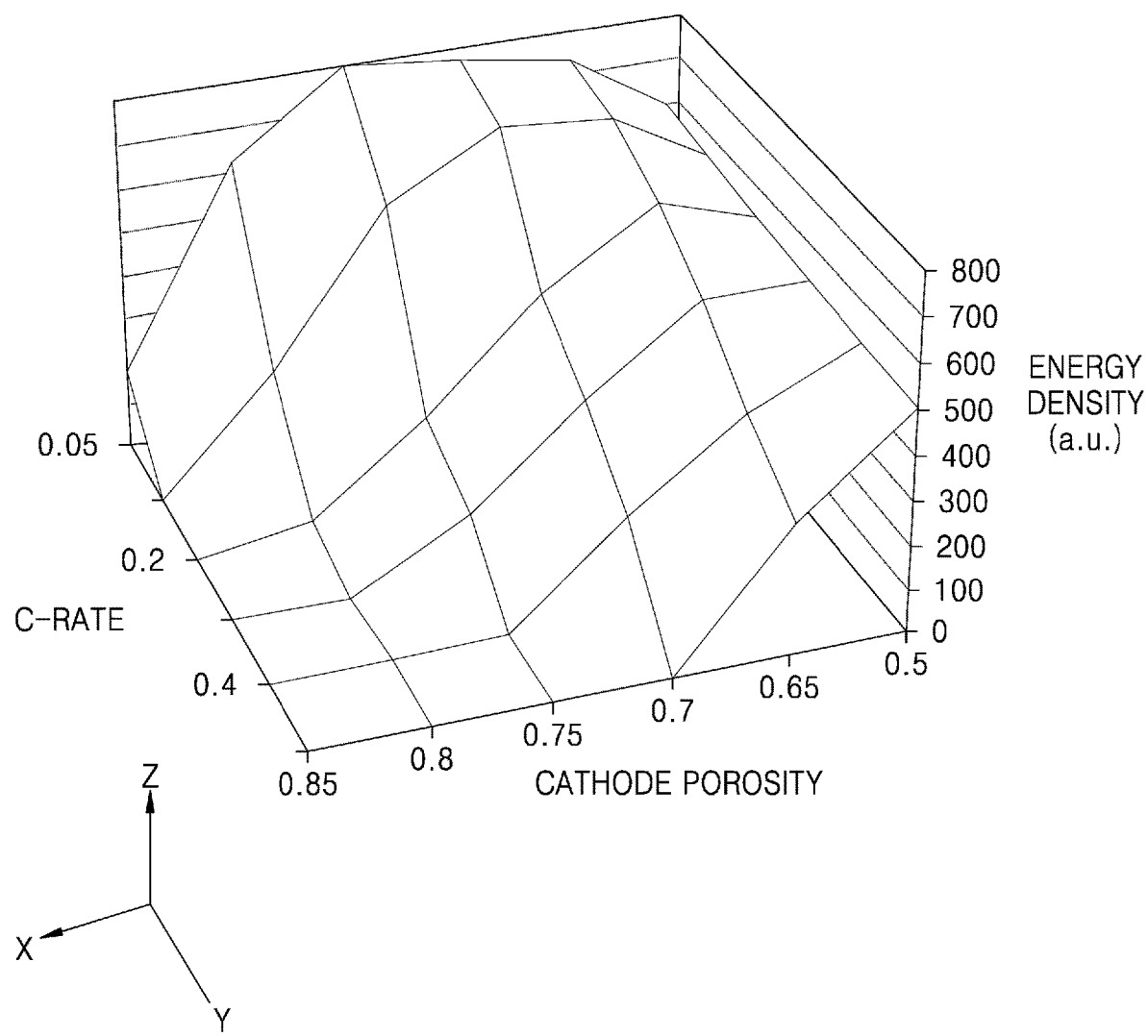
FIG. 14 is a 3D graph showing a portion of FIG. 13 in which the charge rate (C-rate) is 0.05 to 0.5 and the porosity of the cathode layer is 0.5 to 0.85.

FIG. 14 is a 3D graph showing a region of FIG. 13 in which the charge or discharge rate is in a range of about 0.05 to about 0.5, and the porosity of the cathode layer 140 is in a range of about 0.5 to about 0.85.

Figure 15:
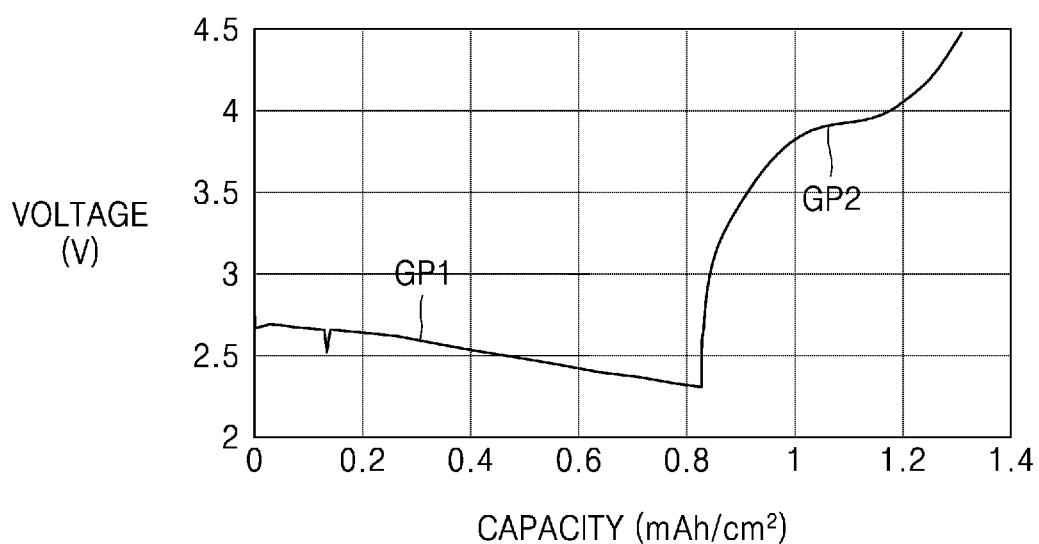
FIG. 15 is a graph of voltage (V) versus capacity (milliamperes-hours per square centimeter ($mAh/cm^2$)) when a metal air battery according to an embodiment is a non-humidifying metal air battery used in a high temperature environment.

FIG. 15, shows the results of analysis of an experimental example of a metal air battery according to an embodiment, and shows a voltage-capacity relationship when the metal air battery according to an embodiment is a non-humidifying metal air battery used in a high temperature environment.

To obtain the results of FIG. 15, a lithium layer, a nitrate melt layer in which sodium nitrate and potassium nitrate are melted, a $Li_{1+x}Ti_{2-x}(PO_4)_3$ ("LTAP") layer wherein $0 \leq x \leq 1$, and a LiLaRuO layer including a lithium-rich layered oxide, e.g., $Li_{1+x}M_{1-x}O_2$ wherein M is a metal such as manganese, respectively are used as an anode layer, an anode electrolyte layer, a cathode electrolyte layer, and a cathode layer of the metal air battery used in the experimental example. The results of FIG. 15 are measured under operating conditions (environments) in which the current density (j), temperature, and porosity of the cathode layer are 0.04 mAh/cm², 150° C., and 0.7, respectively.

In FIG. 15, the horizontal axis represents capacity during charge/discharge, and the vertical axis represents voltage during charge/discharge. In the graph illustrated in FIG. 15, a first portion GP1 represents a voltage-capacity relationship at the time of discharging, and a second portion GP2 represents a voltage-capacity relationship at the time of charging.

The first portion GP1 of FIG. 15 suggests that the metal air battery according to an embodiment may provide sufficient energy even in a non-humidified environment.

Manufacturing Method

When a charging/discharging rate of a metal air battery is determined, the metal air battery according to an embodiment may be manufactured as follows.

The metal air battery may be manufactured to have a cathode layer porosity that satisfies the Equation(s) representing a relationship between porosity and the charge or discharge rate. In an embodiment, when the cathode layer 140 is formed on the cathode electrolyte layer 130, considering the desired charge or discharge rate, the cathode layer 140 may be formed to have a porosity that satisfies the Equation(s) disclosed herein. If the porosity of the cathode layer 140 is related to formation conditions (e.g., temperature during deposition, pressure, gas atmosphere, material, material supply rate) of the cathode layer 140, the cathode layer 140 having a porosity that satisfies the Equation(s) disclosed herein may be formed by controlling the formation conditions when the cathode layer 140 is formed.

Appearance of Metal Air Battery

Figure 16:
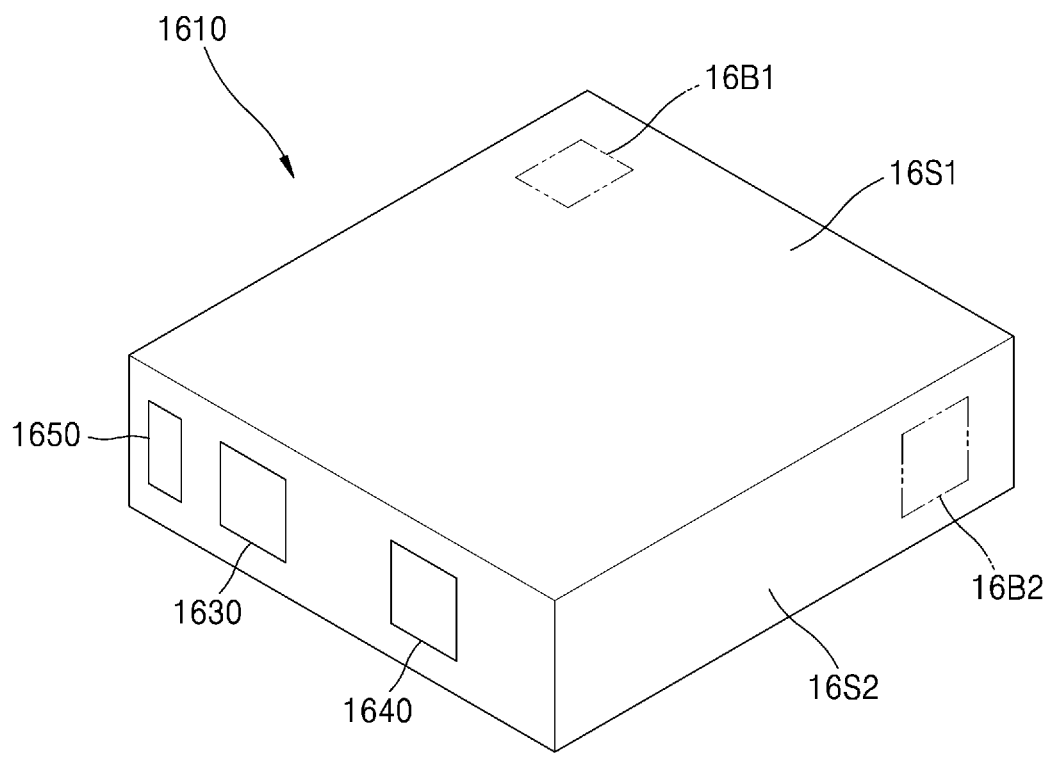
FIG. 16 is a 3D view showing a square metal air battery including the layer structure shown in FIGS. 1 and 2 therein.

FIG. 16 shows a prismatic metal air battery including the layer configuration shown in FIGS. 1 and 2 therein.

Referring to FIG. 16, a metal air battery 1610 according to an embodiment includes first and second electrode terminals 1630 and 1640. One of the first and second electrode terminals 1630 and 1640 may be a positive terminal (+) and the other may be a negative terminal (−). The metal air battery 1610 may include a porosity information providing unit 1650. The porosity information providing unit 1650 may also be referred to as porosity information providing terminal. The porosity information providing unit 1650 may be a port that provides porosity information of the metal air battery 1610, e.g., is configured to permit determination of the porosity of the cathode layer. The porosity information may include the porosity of the cathode layer of the metal air battery 1610. Porosity information of the metal air battery 1610 is provided to an apparatus contacting the metal air battery 1610 through the porosity information providing unit 1650. The porosity information providing unit 1650 may be provided on a surface of the metal air battery 1610 on which the first and second electrode terminals 1630 and 1640 are provided. In an embodiment, the porosity information providing unit 1650 may be provided to the left of the first electrode terminal 1630. In an embodiment, the porosity information providing unit 1650 may be provided between the first electrode terminal 1630 and the second electrode terminal 1640 or to the right of the second electrode terminal 1640. Also, in an embodiment, the porosity information providing unit 1650 may be formed on a surface different from the surface of the metal air battery 1610 on which the first and second electrode terminals 1630 and 1640 are formed, for example, as indicated by dotted boxes 16B1 and 16B2, may be arranged on a front surface 16S1 or a side surface 16S2 of the metal air battery 1610.

Apparatus/Control System Including Metal Air Battery

Figure 17:
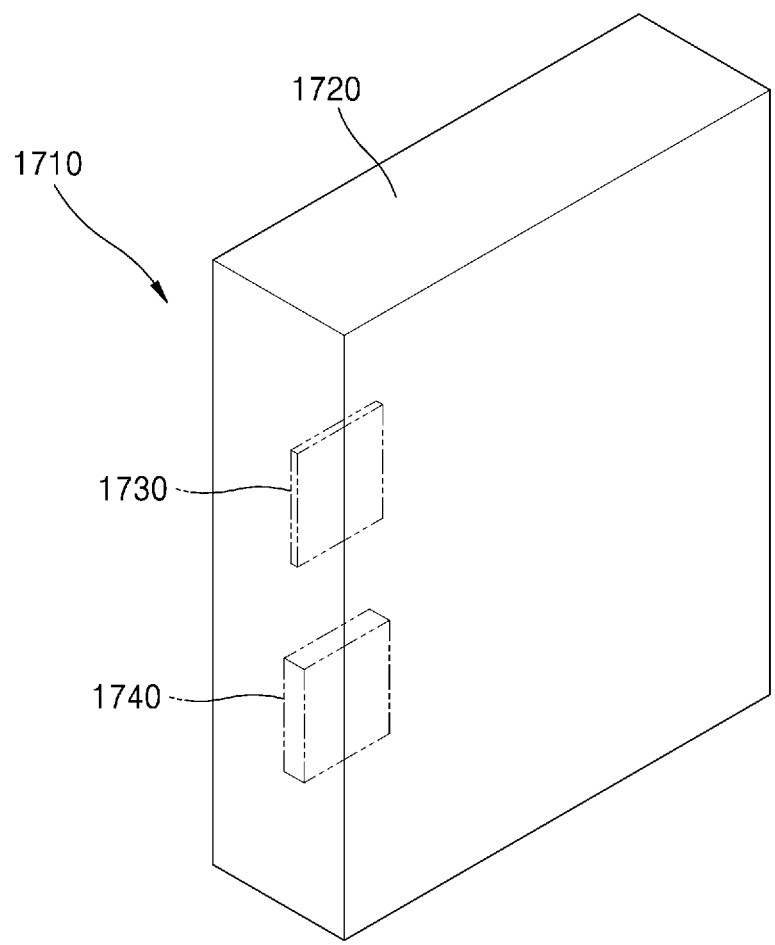
FIG. 17 is a 3D view of an embodiment of an apparatus including a metal air battery.

FIG. 17 shows an apparatus 1710 including a metal air battery according to an embodiment.

The apparatus 1710 including the metal air battery shown in FIG. 17 includes a controller 1730 and a metal air battery 1740 inside a body 1720. The controller 1730 may be configured to control the operation of the entire apparatus 1710 by controlling each unit included in the apparatus 1710. The apparatus 1710 may be an apparatus using the metal air battery 1740 as a power source. For example, the apparatus 1710 may be a transportation apparatus or a communication apparatus. The body 1720 may be a main body of a transportation apparatus or a main body of a communication apparatus. In an embodiment, the apparatus 1710 may be a communication apparatus used in a high temperature environment. In an embodiment, the apparatus 1710 may be a vehicle, such as an automobile. In an embodiment, the metal air battery 1740 may be embedded in the body 1720 and may be undetachably mounted from the body 1720. In an embodiment, the metal air battery 1740 may be detachably mounted from the body 1720. That is, the metal air battery 1740 may be detachably provided on the body 1720. The metal air battery 1740 may be the metal air battery 1610 illustrated in FIG. 16. The controller 1730 may be configured to control a charging/discharging operation of the metal air battery 1740 according to the porosity of the cathode layer of the metal air battery 1740 and the Equation (s) disclosed herein. The controller 1730 may contact the porosity information providing unit 1650 (refer to FIG. 16) of the metal air battery 1740 through a wire. The controller 1730 may receive the porosity of the metal air battery 1740 through the porosity information providing unit 1650 of the metal air battery 1740. The controller 1730 may include a program for controlling an operation for receiving porosity information from the metal air battery 1740 and a charging/discharging operation of the metal air battery 1740 based on received porosity information and the Equation(s) disclosed herein. The porosity information may be given as an electrical signal. The metal air battery 1740 and the controller 1730 may form a metal air battery control system.

When the charging of the metal air battery 1740 is performed by separating the metal air battery 1740 from the apparatus 1710, the charging operation of the metal air battery 1740 may be excluded from a control operation of the controller 1730. In an aspect, the controller 1730 may control two operations among the operations related to the control of the metal air battery 1740, such as, the operation of receiving the porosity information of the metal air battery 1740 and the discharge operation of the metal air battery 1740.

Figure 18:
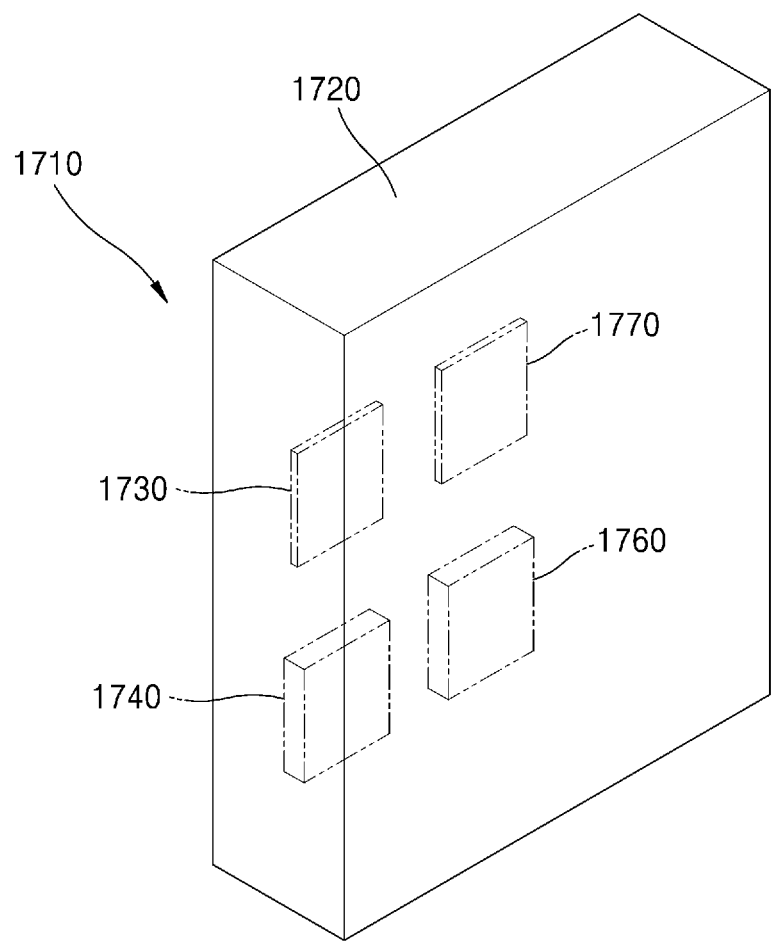
FIG. 18 is a 3D view of an embodiment illustrating a second battery and optionally a second controller further included in the apparatus of FIG. 17.

In an embodiment, as shown in FIG. 18, the apparatus 1710 may further include a second battery 1760. The second battery 1760 may be a metal air battery or a battery different from the metal air battery. When the second battery 1760 is a metal air battery, the porosity of the second battery 1760 may be the same or different from the porosity of the metal air battery 1740. The second battery 1760 may be a metal air battery, and the material of a cathode layer of the second battery 1760 may be different from that of a cathode layer of the metal air battery 1740. When the second battery 1760 is a battery different from the metal air battery, the second battery 1760 may be, for example, a lithium ion battery, but is not limited thereto.

When the second battery 1760 is a metal air battery, the control for the second battery 1760 may be the same as the control for the metal air battery 1740. When the second battery 1760 is not a metal air battery, the controller 1730 may include a separate algorithm for controlling the second battery 1760.

In an embodiment, when the second battery 1760 is not a metal air battery, the apparatus 1710 may additionally include a second controller 1770 for controlling the entire operation of the second battery 1760. In this case, the controller 1730 may be for controlling, e.g., operating, the metal air battery 1740. When the second battery 1760 is charged separately from the apparatus 1710, the second controller 1770 may control the discharge operation of the second battery 1760.

Figure 19:
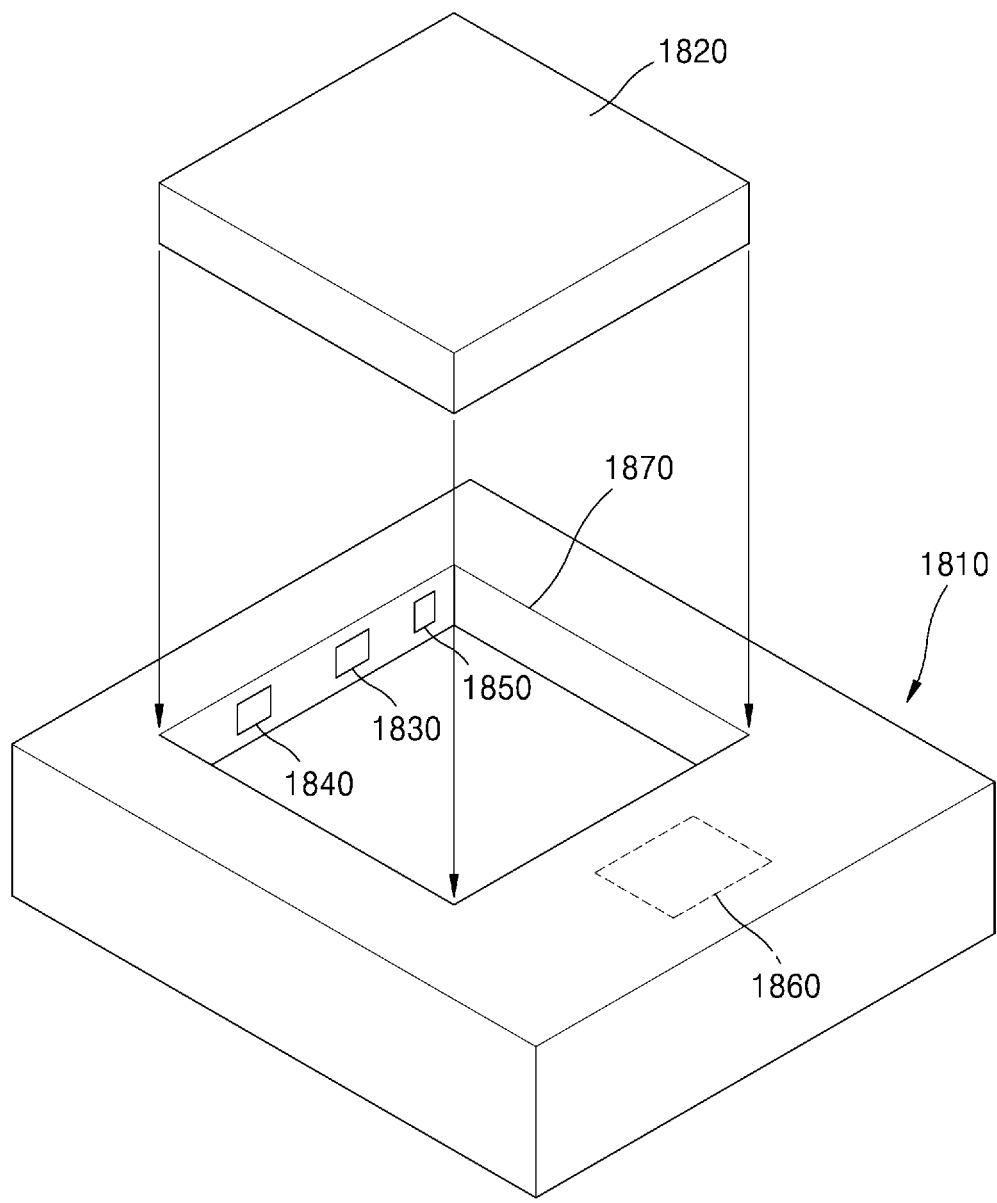
FIG. 19 is a 3D view of an embodiment of an apparatus including a metal air battery.

FIG. 19 shows an apparatus 1810 including a metal air battery according to an embodiment.

The apparatus 1810 illustrated in FIG. 19 may be a charging apparatus for charging a metal air battery.

Referring to FIG. 19, the apparatus 1810 includes a first recess 1870 for mounting a first battery 1820. The first battery 1820 may be the metal air battery 1610 of FIG. 16. First to third terminals 1830, 1840, and 1850 are provided on a surface of the first recess 1870. The first and second terminals 1830 and 1840 are electrode terminals provided in a form capable of contacting the first and second electrode terminals 1630 and 1640 (refer to FIG. 16) of the first battery 1820 when the first battery 1820 is mounted on the first recess 1870. The third terminal 1850 may be provided in a form capable of contacting the porosities information providing unit 1650 (refer to FIG. 16) of the first battery 1820. The apparatus 1810 may include a controller 1860 configured to control an overall operation of the apparatus 1810. The controller 1860 may be provided in a built-in form in the apparatus 1810. For example, the controller 1860 may be provided on a main board (for example, a printed circuit board (PCB)) embedded in the apparatus 1810.

When the first battery 1820 is mounted on the first recess 1870 for charging the first battery 1820, the first and second terminals 1830 and 1840 of the first recess 1870 contact the first and second electrode terminals (1630 and 1640 of FIG. 16) of the first battery 1820, and the third terminal 1850 of the first recess 1870 contacts the porosities information providing unit 1650 of FIG. 16. The controller 1860 may receive porosities information of the first battery 1820 through the third terminal 1850. The porosities information may be received, for example, as an electrical signal. The received porosities information may include porosities of the first battery 1820. The controller 1860 may set, e.g., determine, a C-rate based on the received porosities information and the Equation(s). Charging of the first battery 1820 may be performed at the set, e.g., determined, C-rate. The controller 1860 may include a program for a control operation of the apparatus 1810. The controller 1860 and the first battery 1820 may form a metal air battery control system.

Figure 20:
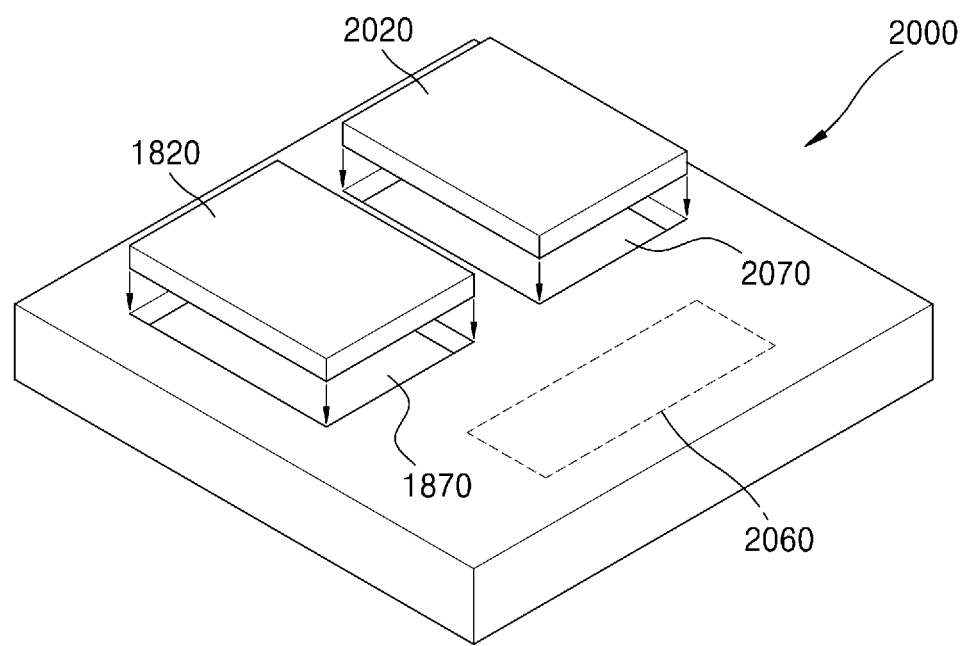
FIG. 20 is a 3D view of an embodiment of a second recessed unit in which a second battery is mounted, and optionally a second controller further provided in the apparatus of FIG. 19.

FIG. 20 shows an apparatus 2000 including a metal air battery according to an embodiment. The apparatus 2000 may be the same as the case in which a second recess 2070 for further mounting a second battery 2020 is added to the apparatus 1810 of FIG. 19. The second battery 2020 may be mounted in the second recess 2070 and charged. The second battery 2020 may be the same metal air battery as the first battery 1820, or may be a different battery from the metal air battery. The entire configuration of the second recess 2070 may be the same as the first recess 1870. The apparatus 2000 may be an apparatus for charging two batteries, that is, the first and second batteries 1820 and 2020. As the second recess 2070 is provided in the apparatus 2000, the controller 1860 may include an algorithm for charging when the second battery 2020 is a metal air battery or when it is not. In an embodiment, the apparatus 2000 may separately include a second controller 2060 for controlling the charging operation of the second battery 2020.

Control Method of Metal Air Battery

Figure 21:
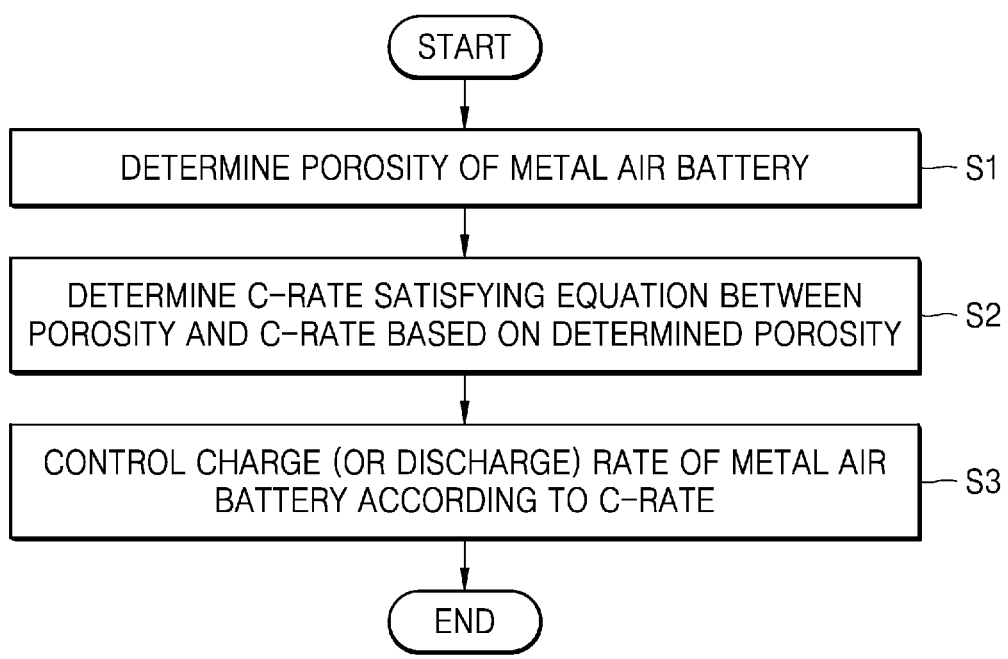
FIG. 21 is a flow chart showing an embodiment of a method of operating a metal air cell.

FIG. 21 shows a control, e.g., operating, method of a metal air battery according to an embodiment.

Referring to FIG. 21, first, a porosity (porosities) of the metal air battery, e.g., the porosity (porosities) of a cathode layer of the metal air battery, is recognized, e.g., determined (S1). The porosity (porosities) of the metal air battery, e.g., the porosity (porosities) of the cathode layer of the metal air battery, may be recognized, e.g., determined, by receiving porosity (porosities) information through the porosity (porosities) information providing unit 1650 of the metal air battery 1610 (refer to FIG. 16) as described with reference to FIGS. 16 to 17. The porosity (porosities) of a metal air battery, e.g., the porosity (porosities) of a cathode layer of a metal air battery, may also be recognized, e.g., determined, by touching or scanning a specific area of a surface of the metal air battery. To this end, the porosity (porosities) of the metal air battery, e.g., the porosity (porosities) of the cathode layer of the metal air battery, may be recorded or displayed on a predetermined location of the surface of the metal air battery in a manufacturing process. For example, the porosity (porosities) of the metal air battery, e.g., the porosity (porosities) of the cathode layer of the metal air battery, may be recorded on a specific area of the metal air battery as a corrugated shape or may be provided through a sensing mark (film) or chip attached to a specific area of the metal air battery.

Next, based on the recognized, e.g., determined, porosity (porosities), a C-rate, e.g., a charge or discharge rate, satisfying the Equation(s) that represents a relationship between the cathode layer porosity and the charge or discharge rate is set, e.g., determined (S2).

Next, at least one of a charge rate or a discharge rate of the metal air battery is controlled according to the set, e.g., determined, C-rate (S3).

In the control, e.g., operating, method, the metal air battery may perform charging and discharging at a first C-rate that satisfies the Equation(s) disclosed herein while performing charging and discharging at a second C-rate different from the first C-rate in some charging and discharging sections.

When two batteries are mounted on the apparatus and both of the two batteries are metal air batteries, the first to third operations (S1 to S3) may be applied to each of the two batteries. When one of the two batteries is not a metal air battery, the charge and discharge operation for the battery may be performed according to an algorithm provided for the corresponding battery.

The cathode layer of the metal air battery according to an embodiment has porosities at which the energy density of the battery is improved at a given C-rate. The porosities of the cathode layer may be determined in the battery manufacturing stage considering a use environment (e.g., C-rate) of the battery. When the metal air battery according to an embodiment is used, improved energy may be provided in a battery use environment. Accordingly, the metal air battery according to an embodiment may be used as an optimized energy supply means for various fields (for example, a mobile device, such as an electric vehicle) and various environments.

It should be understood that embodiments described herein should be considered in a descriptive sense only and not for purposes of limitation. Descriptions of features, aspects, or advantages within each embodiment should be considered as available for other similar features, aspects, or advantages in other embodiments. While an embodiment has been described with reference to the figures, it will be understood by those of ordinary skill in the art that various changes in form and details may be made therein without departing from the spirit and scope as defined by the following claims.

What is claimed is:

1. A metal air battery apparatus comprising:
    a metal air cell comprising
        a cathode layer comprising pores,
        an anode layer facing the cathode layer, and
        a solid electrolyte layer between the cathode layer and the anode layer; and
    a controller configured to control at least one of a charge rate or a discharge rate of the metal air cell based on a porosity of the cathode layer.

2. The apparatus of claim 1, wherein the cathode layer comprises a mixed ionic-electronic conductor.

3. The apparatus of claim 1, wherein the cathode layer comprises:
    an electron conductive layer that provides a path for oxygen flow; and
    an ion conductive layer that provides a path for oxygen flow.

4. The apparatus of claim 1, wherein the porosity of the cathode layer is in a range of about 0.2 to about 0.9, based on a total volume of the cathode layer of 1.

5. The apparatus of claim 1, wherein the metal air cell further comprises:
    a first electrode terminal;
    a second electrode terminal; and
    a port in fluid communication with the cathode layer, wherein the port is configured to permit determination of the porosity of the cathode layer.

6. The apparatus of claim 3, wherein each of the electron conductive layer and the ion conductive layer is in fluid communication with a source of oxygen.

7. A metal air battery apparatus comprising:
    a metal air battery comprising
        a first metal air cell comprising
            a first cathode layer comprising pores,
            a first anode layer facing the first cathode layer, and
            a solid electrolyte layer between the first cathode layer and the first anode layer, and
        a second cell at a location different from a location of the first metal air cell; and
    a controller configured to control at least one of a charge rate or a discharge rate of the first metal air cell based on a porosity of the first cathode layer.

8. The apparatus of claim 7, wherein
    the second cell comprises a second metal air cell comprising a second cathode layer comprising pores, and
    a porosity of the second cathode layer is the same as or different from the porosity of the first cathode layer.

9. The apparatus of claim 8, wherein the controller is configured to control at least one of a charge rate or a discharge rate of the second metal air cell based on the porosity of the second cathode layer.

10. The apparatus of claim 8, wherein the controller comprises:
    a first controller configured to control at least one of a charge rate or a discharge rate of the first metal air cell based on the porosity of the first cathode layer; and
    a second controller configured to control at least one of a charge rate or a discharge rate of the second metal air cell based on the porosity of the second cathode layer.

11. The apparatus of claim 8, wherein the second cathode layer comprises a mixed ionic electronic conductor.

12. The apparatus of claim 8, wherein the second metal air cell comprises:
    a second anode layer facing the second cathode layer,
    a solid electrolyte layer between the second cathode layer and the second anode layer,
    a first electrode terminal,
    a second electrode terminal, and
    a port in fluid communication with second cathode layer, wherein the port is configured to permit determination of the porosity of the second cathode layer.

13. The apparatus of claim 7, wherein the first cathode layer comprises a mixed ionic electronic conductor.

14. The apparatus of claim 7, wherein the first metal air cell further comprises:
    a first electrode terminal,
    a second electrode terminal, and
    a port in fluid communication with first cathode layer, wherein the port is configured to permit determination of the porosity of the first cathode layer.

15. A metal air cell comprising:
    a cathode layer comprising a mixed ionic electronic conductor;
    an anode layer facing the cathode layer; and
    a solid electrolyte layer between the cathode layer and the anode layer, wherein
    a porosity P1 of the cathode layer satisfies Equation 2

$$(-0.122 \ln(R)+0.3) \leq P1 \leq (-0.122 \ln(R)+0.5),$$

wherein R is a charge rate or a discharge rate of the metal air cell and is in a range of about 0.01 C to about 2.3 C.

16. The metal air cell of claim 15, wherein the porosity of the cathode layer is in a range of about 0.2 to about 0.6, based on a total volume of the cathode layer of 1.

17. The metal air cell of claim 15, wherein the porosity of the cathode layer is in a range of about 0.2 to about 0.4, based on a total volume of the cathode layer of 1.

18. A method of operating a metal air cell, the method comprising:
   determining a porosity of a cathode layer of the metal air cell;
   determining a charge rate or a discharge rate of the metal air cell according to Equation 3

$$e^{((P1-0.3)/-0.122)} \leq R \leq e^{((P1-0.5)/-0.122)},$$

wherein P1 is the porosity of the cathode layer of the metal air cell and R is a charge rate or a discharge rate of the metal air cell; and
   controlling at least one of a charge rate or a discharge rate of the metal air cell such that at least one of a charge rate or a discharge rate of the metal air cell satisfies Equation 3.

19. The method of claim 18, comprising controlling the charge rate of the metal air cell.

20. The method of claim 18, comprising controlling the discharge rate of the metal air cell.

21. The method of claim 18, wherein P1 is in a range of about 0.2 to about 0.9, based on a total volume of the cathode layer of 1.

* * * * *